United States Patent
Schmalstieg et al.

(10) Patent No.: US 10,185,775 B2
(45) Date of Patent: Jan. 22, 2019

(54) SCALABLE 3D MAPPING SYSTEM

(71) Applicant: QUALCOMM Incorporated, San Diego, CA (US)

(72) Inventors: Dieter Schmalstieg, Graz (AT); Clemens Arth, Judendorf-Strassengel (AT); Christian Pirchheim, Graz (AT)

(73) Assignee: QUALCOMM Technologies, Inc., San Diego, CA (US)

( * ) Notice: Subject to any disclaimer, the term of this patent is extended or adjusted under 35 U.S.C. 154(b) by 438 days.

(21) Appl. No.: 14/862,050

(22) Filed: Sep. 22, 2015

(65) Prior Publication Data
US 2016/0179830 A1   Jun. 23, 2016

Related U.S. Application Data

(60) Provisional application No. 62/190,702, filed on Jul. 9, 2015, provisional application No. 62/094,900, filed on Dec. 19, 2014.

(51) Int. Cl.
*G06F 7/00* (2006.01)
*G06F 17/30* (2006.01)
(Continued)

(52) U.S. Cl.
CPC .... *G06F 17/3087* (2013.01); *G06F 17/30241* (2013.01); *G06F 17/30268* (2013.01);
(Continued)

(58) Field of Classification Search
CPC ........... G06F 17/3087; G06F 17/30241; G06F 17/30268; G06F 17/30333;
(Continued)

(56) References Cited

U.S. PATENT DOCUMENTS

2005/0033758 A1 * 2/2005 Baxter .............. G06F 17/30038
2008/0082264 A1   4/2008 Hill et al.
(Continued)

FOREIGN PATENT DOCUMENTS

WO   0127812 A2   4/2001

OTHER PUBLICATIONS

Anonymous : "Find Maps," Oct. 1, 2014 (Oct. 11, 2014) pp. 1-3. XP055247078, Retrieved from the Internet: URL:http://web.archive.orgjweb/20141011010813/http://www.mapraider.com/ [retrieved on Feb. 3, 2016] p. 1.
(Continued)

*Primary Examiner* — Azam M Cheema
(74) *Attorney, Agent, or Firm* — Austin Rapp & Hardman, P.C.

(57) ABSTRACT

Disclosed are a system, apparatus, and method for multiple client simultaneous localization and mapping. Tracking and mapping may be performed locally and independently by each of a plurality of clients. At configurable points in time map data may be sent to a server for stitching and fusion. In response to successful stitching and fusion to one or more maps known to the server, updated position and orientation information relative to the server's maps may be sent back to the clients. Clients may update their local map data with the received server location data. Clients may receive additional map data from the server, which can be used for extending their maps. Clients may send queries to the server for 3D maps, and the queries may include metadata.

30 Claims, 12 Drawing Sheets

(51) Int. Cl.
*G06T 17/05* (2011.01)
*G06T 19/20* (2011.01)

(52) U.S. Cl.
CPC .. *G06F 17/30333* (2013.01); *G06F 17/30592* (2013.01); *G06T 17/05* (2013.01); *G06T 19/20* (2013.01); *G06T 2219/2004* (2013.01)

(58) Field of Classification Search
CPC ... G06F 17/30592; G06T 17/05; G06T 19/20; G06T 2219/2004
See application file for complete search history.

(56) References Cited

U.S. PATENT DOCUMENTS

| | | | |
|---|---|---|---|
| 2010/0223299 A1* | 9/2010 | Yun | G06F 17/30277 707/803 |
| 2011/0018865 A1 | 1/2011 | Lee | |
| 2012/0300979 A1* | 11/2012 | Pirchheim | G06T 7/0042 382/103 |
| 2014/0267234 A1 | 9/2014 | Hook et al. | |
| 2014/0320593 A1 | 10/2014 | Pirchheim et al. | |
| 2014/0323148 A1 | 10/2014 | Schmalstieg et al. | |
| 2015/0098645 A1* | 4/2015 | Leung | G06F 17/30811 382/154 |

OTHER PUBLICATIONS

Anonymous : "Mapraider Tools & Plugins," Nov. 12, 2014 (Nov. 12, 2014), pp. 1-1, XP055247080, Retrieved from the Internet: URL:http://web.archive.org/web/20141112111135/http://www.mapraider.com/tools/ [retrieved on Feb. 3, 2016] p. 1.

International Search Report and Written Opinion—PCT/US2015/063243—ISA/EPO—dated Feb. 12, 2016, 14 pages.

Riazuelo L., et al., "C2TAM: A Cloud Framework for Cooperative Tracking and Mapping," Robotics and Autonomous Systems, 2014, vol. 62, pp. 401-413.

Castle, et al., "Wide-area Augmented Reality using Camera Tracking and Mapping in Multiple Regions," Journal of Computer Vision and Image Understanding 2011.

Gauglitz, et al. "Model Estimation and Selection towards Unconstrained Real-Time Tracking and Mapping," IEEE Transactions on Visualization and Computer Graphics (TVCG), vol. 20(6), pp. 825-838, Jun. 2014.

Sweeney, Chris, 'Improved Outdoor Augmented Reality through "Globalization"'. IEEE International Symposium on Mixed and Augmented Reality 2013 Science and Technology Proceedings, Oct. 2013, 4 pgs., Australia.

Wendel, et al., "Dense reconstruction on-the-fly," Computer Vision and Pattern Recognition (CVPR), 2012 IEEE Conference on, IEEE, 2012, pp. 1450-1457.

Ventura, et al., "Global Localization from Monocular SLAM on a Mobile Phone," IEEE Transactions on Visualization and Computer Graphics, 20(4):531-539, Mar. 2014.

Zou, et al., "CoSLAM: Collaborative Visual SLAM in Dynamic Environments," IEEE Trans. Pattern Anal. Mach. Intell. 35(2):354-366 (2013).

Castle, et al., "Video-rate localization in multiple maps for wearable augmented reality," 12th IEEE International Symposium on Wearable Computers 2008 (ISWC 2008), pp. 15-22.

Klein, et al., "Parallel Tracking and Mapping for Small AR Work spaces", 6th IEEE and ACM International Symposium on Mixed and Augmented Reality, 2007 (ISMAR 2007), pp. 1-10.

Middelberg, et al., "Scalable 6-DOF Localization on Mobile Devices," ECCV 2014, 16 pgs.

* cited by examiner

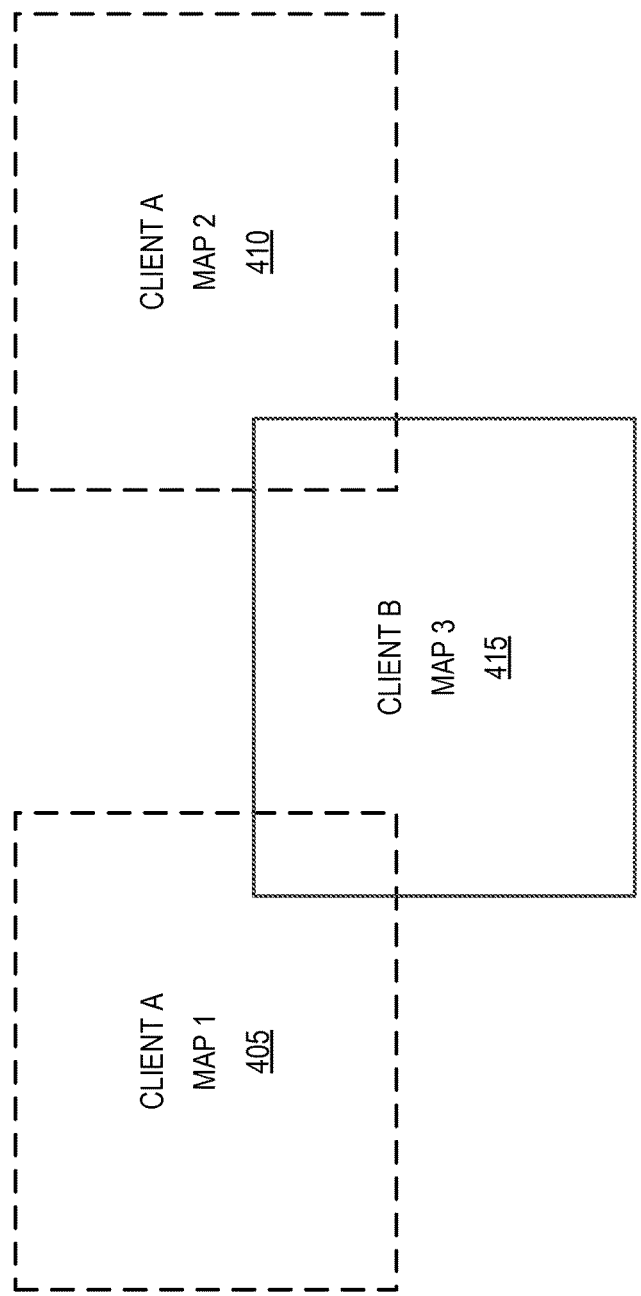

SCALABLE 3D MAPPING SYSTEM

CROSS-REFERENCE TO RELATED APPLICATIONS

This application claims the benefit of priority from U.S. Provisional Application No. 62/190,702, filed on Jul. 9, 2015, entitled, "MULTIPLE CLIENT SLAM," and U.S. Provisional Application No. 62/094,900, filed on Dec. 19, 2014, entitled "MULTIPLE USER SLAM," which are herein incorporated by reference.

FIELD

The subject matter disclosed herein relates generally to computer vision techniques and 3D map implementation with a plurality of clients.

BACKGROUND

Computer vision is a field that includes methods and systems for acquiring, analyzing, processing, and understanding images (e.g., real world image captures) to provide an event or result. For example, one computer vision technique is Simultaneous Localization and Mapping (SLAM), which can process the input of a single camera and continuously build up a three dimensional (3D) model (e.g., reconstructed map) of an environment as the camera moves in Six Degrees of Freedom (6DOF). SLAM systems can simultaneously track the pose of the camera with respect to the 3D model while mapping the 3D model. Keyframe-based visual SLAM systems can process discretely selected frames from the incoming camera image stream or feed. Keyframe-based visual SLAM systems assume general camera motion and apply structure-from-motion techniques to create 3D feature maps.

Modern keyframe-based computer vision (e.g., SLAM) systems subdivide work into parallel tracking and mapping (PTAM) threads. Both the tracking and mapping threads may be processed in parallel, but asynchronously. The tracking thread may perform at a full frame rate, while mapping is typically more computationally intensive and thus slower. Scaling computer vision to large areas and letting multiple clients/users or robots participate in the processing of computer vision work creates the need for stitching two or more separate map pieces/sections together. In general, stitching refers to the discovery of overlapping portions from two or more maps and determining the corresponding 7DOF similarity transform (composed of a 3DOF orientation, a 3DOF position, and a 1D scale). If one of the maps covers a much larger area than the other, this is sometimes called "place recognition." After successful stitching or place recognition, map fusion may be performed. Map fusion, or simply "fusion" typically describes the processing of data or information from separate maps to combine into a single map. For example fusion may be performed with a form of Structure from Motion (SfM) technique applied to the image information from the separate source maps.

With respect to some types of computer vision techniques, the four tasks of tracking, mapping, stitching, and fusion may have increasing computational requirements as additional data or information is processed. To support many maps, a single and independent user/client may be unable to process all data associated with tracking, mapping, stitching, and fusion. However, offloading mapping to a server may cause clients to become reliant upon the server for content. Clients may rely upon the connection to the server to generate real-time local map dependent content. For example, such content may be used in Augmented Reality (AR) applications. Additionally, maps on servers are typically not scalable or well organized. Therefore, improved techniques are desirable.

SUMMARY OF THE DESCRIPTION

Embodiments disclosed herein may relate to a method performed by a server for implementing a 3D map database. The method may include: receiving one or more keyframes and associated metadata from a client; storing the received one or more keyframes in the 3D map database; tagging the received one or more keyframes in the 3D map database according to the received metadata; receiving a client request for map data; searching the 3D map database for map data according to the client request; and providing, in response to the searching, a resulting map data to the client requesting the map data.

Embodiments disclosed herein may relate to a server for implementing a 3D map database. The server may be configured to: receive one or more keyframes and associated metadata from a client; store the received one or more keyframes in the 3D map database; tag the received one or more keyframes in the 3D map database according to the received metadata; receive a client request for map data search the 3D map database for map data according to the client request; and provide, in response to the searching, a resulting map data to the client requesting the map data.

Embodiments disclosed herein may relate to a machine readable non-transitory storage medium having stored therein program instructions that are executable by a server's processor to: receive one or more keyframes and associated metadata from a client; store the received one or more keyframes in the 3D map database; tag the received one or more keyframes in the 3D map database according to the received metadata; receive a client request for map data search the 3D map database for map data according to the client request; and provide, in response to the searching, a resulting map data to the client requesting the map data.

Embodiments disclosed herein may relate to an apparatus for implementing a 3D map database. The apparatus may include: means for receiving one or more keyframes and associated metadata from a client; means for storing the received one or more keyframes in the 3D map database; means for tagging the received one or more keyframes in the 3D map database according to the received metadata; means for receiving a client request for map data; searching the 3D map database for map data according to the client request; and means for providing, in response to the searching, a resulting map data to the client requesting the map data.

Other features and advantages will be apparent from the accompanying drawings and from the detailed description.

BRIEF DESCRIPTION OF THE DRAWINGS

FIG. 4A illustrates stitching representation of maps associated with two different clients in a S3DM system, in one embodiment;

DETAILED DESCRIPTION

Figure 1:
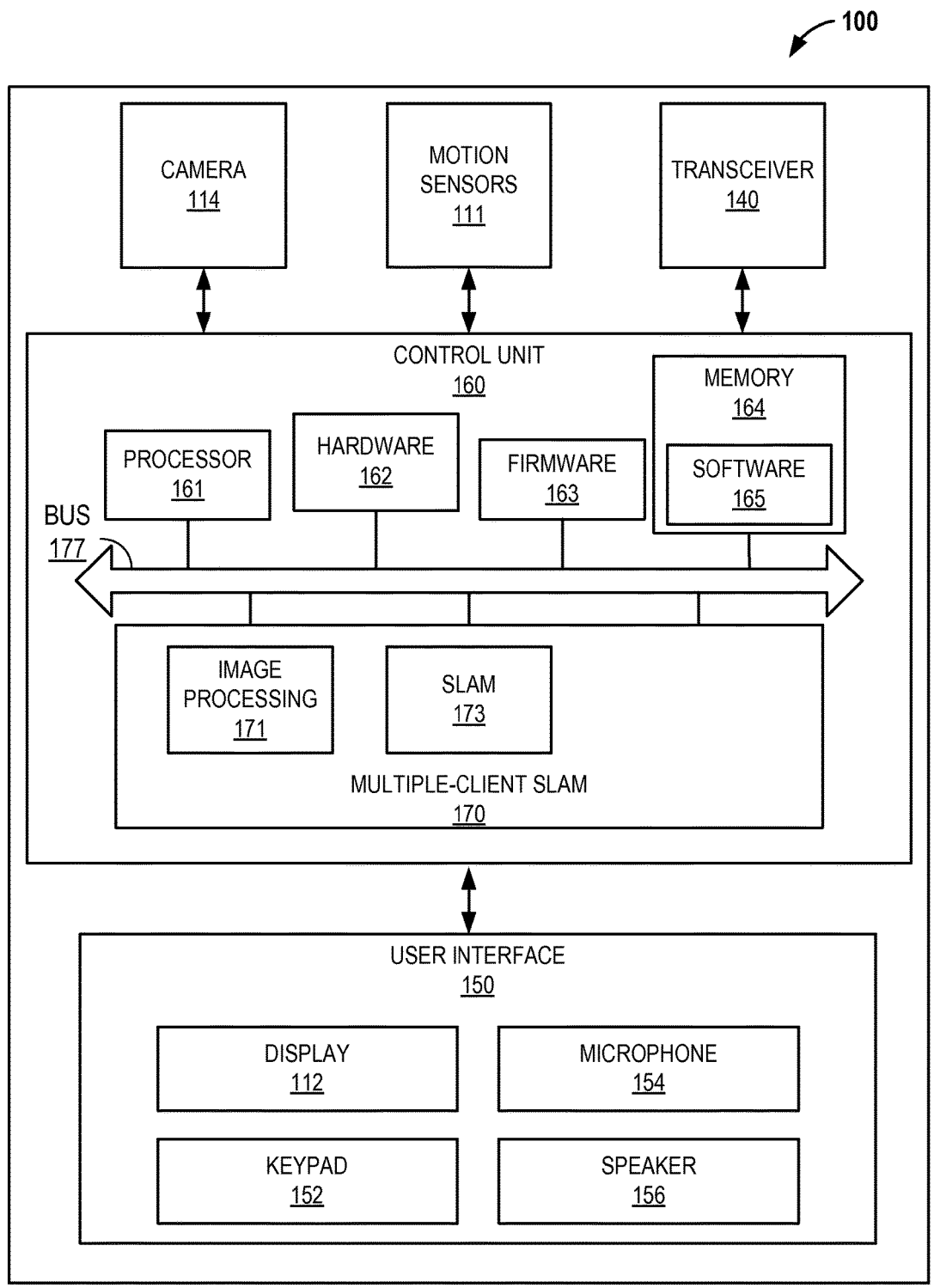
FIG. 1 is a block diagram illustrating an exemplary system in which embodiments of a Scalable 3D Map (S3DM) may be practiced.

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

In one embodiment, a Scalable 3D Map (S3DM) system subdivides tracking, mapping, stitching, and fusion across one or more client(s) and server(s). The S3DM also includes an annotation or tagging system to associate metadata determined by the server and/or received by clients with a 3D map database (e.g., a SFM database, and map pool storage). For example, the 3D map database may include an image database that is linked with a 3D map pool. In one embodiment, the image database contains all keyframes and their associated metadata. The keyframes contained in the image database may be linked with zero, one, or more maps contained in the map pool. In one embodiment, for each keyframe-map link: the keyframe is spatially registered within the corresponding map (e.g., with a 6DOF pose); and the keyframe metadata can be applied to the corresponding map. In one embodiment, tracking, mapping, stitching, and fusion components are performed asynchronously and/or in parallel so that optimal scalability is achieved. For example, clients within the S3DM system can track and map objects and environments as a self-contained operation in the client's local reference system (e.g., a mobile or portable device). Each client implemented the S3DM can create and maintain maps of their environment and objects locally on each respective client. Therefore, S3DM clients can resolve re-localization within the respective client's particular local map without relying on a server.

In one embodiment, through subdivision of labor, independent and heterogeneous clients are possible. Clients may be authorized as "swarm" members. Swarm members may provide information (e.g., visual observations of the environment) to the server, and, in return, receive updates on the other member(s) of the swarm and on the mapped environment. In some embodiments, the client swami members may run independently of the server. This independence may be achieved by executing an independent SLAM instance on the each client. Beyond basic SLAM capabilities, i.e., mapping and camera tracking, more capable clients can add additional capabilities, including keyframe metadata tagging and augmented reality annotation rendering and interaction. Maps that start out independently can be merged (e.g., through keyframes annotated or tagged with metadata) on request or in a predetermined batch process to create globally referenced maps. In one embodiment, the server attempts to merge client maps when possible and thus can provide a common reference coordinate system that allows for exchanging spatially registered information between clients. This approach is a robust framework that allows for collaboratively mapping and tracking a scene in real-time between a server and multiple mobile clients.

FIG. 1 is a block diagram illustrating an exemplary system in which embodiments of the S3DM system may be practiced. In one embodiment, S3DM includes a multi-user system for tracking and mapping, which accommodates mobile clients with different capabilities, mediated by a server capable of providing real-time structure from motion. Clients may share their observations of the scene according to their individual capabilities. This can involve not only keyframe tracking, but also mapping and map densification, if more computational resources are available. In one embodiment, S3DM is a system architecture that lets heterogeneous clients contribute to a collaborative mapping effort, without prescribing fixed capabilities for client devices. The system may be a device 100, which may include a general purpose processor 161, Image Processing module 171, SLAM module 173, and a memory 164. The device 100 may also include a number of device sensors coupled to one or more buses 177 or signal lines further coupled to at least the Image Processing 171, and SLAM 173 modules. Modules 171 and 173 are illustrated separately from processor 161 and/or hardware 162 for clarity, but may be combined and/or implemented in the processor 161 and/or hardware 162 based on instructions in the software 165 and the firmware 163. Control unit 160 can be configured to implement methods of performing S3DM as described herein. For example, the control unit 160 can be configured to implement functions of device 100 (e.g., at least the methods illustrated in FIGS. 5A and 5B).

Device 100 may be a: server, mobile device, wireless device, cell phone, augmented reality device (AR), personal digital assistant, wearable device (e.g., eyeglasses, watch, head wear, or similar bodily attached device), mobile computer, tablet, personal computer, laptop computer, data processing device/system, or any type of device that has processing capabilities.

In one embodiment, device 100 is a mobile/portable platform (e.g., client). Device 100 can include a means for capturing an image, such as camera 114 and may optionally include motion sensors 111, such as accelerometers, gyroscopes, electronic compass, or other similar motion sensing elements. Device 100 may also capture images on a front or rear-facing camera (e.g., camera 114). The device 100 may further include a user interface 150 that includes a means for displaying an augmented reality image, such as the display 112. The user interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include other elements unrelated to the present disclosure, such as a satellite position system receiver, power device (e.g., a battery), as well as other components typically associated with portable and non-portable electronic devices.

In one embodiment, device 100 is a server that can communicate with one or more mobile devices or clients and perform server functions associated with S3DM as described herein. For example, device 100 may perform stitching and fusion of maps received from one or more clients and send place information and annotation data associated with maps.

Device 100 may communicate via one or more wireless communication links through a wireless network that are based on or otherwise support any suitable wireless communication technology. For example, in some aspects, device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

As described above, the device 100 can be a portable electronic device (e.g., smart phone, dedicated augmented reality (AR) device, game device, or other device with AR processing and display capabilities). The device implementing the AR system described herein may be used in a variety of environments (e.g., shopping malls, streets, offices, homes or anywhere a user may use their device). Users can interface with multiple features of their device 100 in a wide variety of situations. In an AR context, a user may use their device to view a representation of the real world through the display of their device. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

Figure 2:
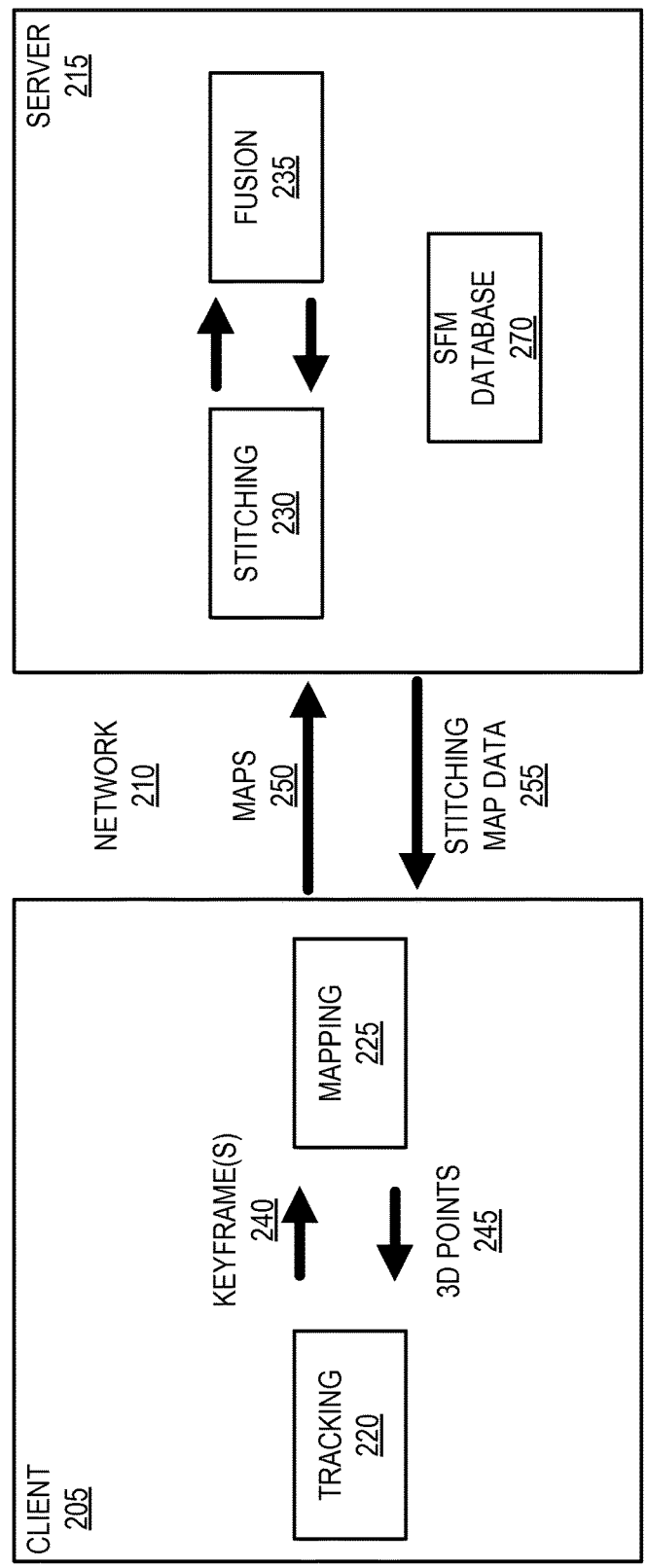
FIG. 2 illustrates asynchronous workflow for a client and a server in a S3DM system, in one embodiment.

FIG. 2 illustrates asynchronous workflow for a client and a server, in one embodiment. In one embodiment, one or more servers stitch and fuse maps (e.g., local maps received from one or more clients) to maintain a consistent view of all the map data provided by the clients and known to the server. In one embodiment, the stitching process determines the relative Seven Degrees of Freedom (7DOF) similarity transform (e.g., 3DOF translation, 3DOF rotation, and 1DOF scale) from one map coordinate system to the other. In response to a successful stitching of two or more maps, a server can notify the client that sent the local map. For example, if the server succeeds in stitching a client's current map "A" to another (e.g., prior or previously created) map "B", the server can notify the client of "place recognition A-B." In one embodiment, S3DM notifies clients of place recognition by sending Augmented Reality (AR) content registered in a specified coordinate system. For example, the sent content may be registered to coordinate system "X", but can now be displayed by the client, which may be aligned to a different coordinate system "Y". In one embodiment, S3DM fusion performed by the server, receives stitched maps and incorporates the stitched maps into a global map on the server. As used herein, stitching generally refers to determining the similarity transform, while combining the information from both maps into a single, improved map is referred to as map fusion or simply "fusion". Thus, fusion refers to data association (e.g. matching corresponding features) and optimization (e.g. global bundle adjustment). Optimization may be performed over all or a portion of the information from both maps.

In one embodiment, when multiple users within an environment (e.g., room) have a mobile device with camera capability, the group of devices may be used as a "swarm" of smart cameras. Together, multiple mobile devices can work more efficiently on simultaneous localization and mapping (SLAM) than any single mobile device alone could. With tracking and mapping in a single workspace, collaborative applications for augmented reality (AR) are enabled, such as interior design or games involving physical objects. However, a swarm of unmodified mobile devices may lack many properties that traditional multi-camera systems employed in robotics have. For example, non-robotic implementations may not typically have a fixed geometric arrangement, their capabilities in terms of image quality and computational performance may differ dramatically, and their availability may change (e.g., as users leave the room or run out of battery power).

In one embodiment, S3DM utilizes wireless networking, to provide computational performance and persistent storage via cloud computing. Clients may operate as a swarm, while physically being communicatively coupled/connected to a server (e.g., cloud server). The server can receive keyframes from the clients and utilize the received keyframes as an image database. In one embodiment, the server can perform 3D reconstruction applying Structure from Motion (SfM) techniques, using the images contained in the database. In some embodiments, a tight-loop distributed computation approach between servers and clients may not be efficient to implement a multi-user SLAM system. For example, a client relying on low-latency response from the server (e.g., for interest point triangulation) may fail if server or network connection are compromised (e.g., connection throughput, bandwidth, latency, or other aspect is slowed down). However, network connectivity issues may be likely in real-world cloud computing and can impact previous multi-client SLAM systems. In embodiments described herein, S3DM provides advances in efficiency over prior networked systems.

In one embodiment, S3DM may extract features from camera images (e.g., as part of tracking 220 on the client device 205). A feature (e.g., feature point or interest point) as used herein is as an interesting or notable part of an image. The features extracted from the captured image may represent distinct points along three-dimensional space (e.g., coordinates on axes X, Y, and Z) and every feature point may have an associated feature location. The features in camera images either match or fail to match (i.e., are the same or correspond to) the features of previously captured images. Feature detection may be an image processing operation to examine every pixel to determine whether a feature exists at a particular pixel. Feature detection may process an entire captured image or, alternatively certain portions or parts of the captured image.

In one embodiment, S3DM receives a query from a client and performs stitching by the server according to the query received. Alternatively stitching may be performed offline ahead of time and asynchronously.

For each captured image or video frame, once features have been detected, a local image patch around the feature can be extracted. Features may be extracted using well-known techniques, such as Scale Invariant Feature Transform (SIFT), which localizes features and generates their descriptions. If desired, other techniques, such as Speed Up Robust Features (SURF), Gradient Location-Orientation histogram (GLOH), Normalized Cross Correlation (NCC) or other comparable techniques may be used. When the number of extracted features for an image is determined to exceed a threshold (e.g., 100 point features or other number of points) the image and features can be saved as a keyframe (e.g., keyframe(s) 240).

In one embodiment, S3DM can create a local 3D map from the received keyframes 240. Mapping 225 can improve local map quality through data association refinement and bundle adjustment optimization. Mapping 225 can perform keyframe selection to choose keyframes for inclusion in the local map on the client, based on parallax and coverage. Coverage indicates whether the current frame pose is robustly constrained with projected map features. Low coverage may indicate that the camera is observing unmapped scene regions. Mapping 225 can send 3D map data to tracking 220 in order to perform re-localization.

When S3DM detects low coverage but not enough parallax between the current frame and existing keyframes, tracking may fail. S3DM may trigger the creation of a new local map in response to failure to re-localize the map after tracking failure. S3DM can send one or more portions of the current local map to the server in response to failure to re-localize the current local map. In some embodiments, S3DM updates the server with individual keyframes and/or local maps 250.

In one embodiment, S3DM performed at the server stitches maps (e.g., map 250) sent by one or more clients/users (e.g., client 205). Stitching 230 and Fusion 235 of multiple maps utilizes feature matching in large Structure-From-Motion (SFM) databases. Traditionally, the stitching of multiple maps is a difficult problem because of many confounding factors in the source images (e.g., poor lighting, blur, repetitive structures, texture-less areas, and outdated imagery). In one embodiment, S3DM stitches multiple maps by identifying or classifying input maps (e.g., local maps from clients).

Incoming maps and keyframes (e.g., received at a server) may be annotated with properties (e.g., priors or metadata) obtained from their respective clients. For example, properties may include global positioning system (GPS) positioning data, WiFi Identifier (e.g., SSID), user ID (e.g., user login credential, or unique identifier), application Identifier, age (e.g., timestamps at moment of keyframe creation or camera image capture), or a combination thereof.

In one embodiment, the SFM database 270 is organized according to the received properties. The server may allow for different heterogeneous client SLAM applications and users which may be handled individually (e.g. providing a certain quality of service) based on their IDs. Furthermore, the SFM database may contain a bin or section defined by quantizing the GPS position to a configurable region (e.g., 100 meter by 100 meter area or some other combination of measurements). Similarly, WiFi SSIDs may be automatically associated with a global GPS position or manually assigned to a bin/section (e.g., in GPS-isolated indoor environments).

Place recognition or Stitching 230 refers to the discovery of overlapping portions of two maps (e.g., by matching corresponding image features observing the same 3D map features) and computing the corresponding 7DOF similarity transform (e.g. using a 3D-3D map feature registration method) that aligns the two maps. When a received local map 250 is successfully stitched to a close-by map (e.g., a previously received local map or a designated global map), previously unconnected parts of the SFM database are connected. Thus, successful stitching and eventual fusion 235 can improve the global scope of the map. However, local maps from clients may be stored in the SFM database at a server, even if they cannot be stitched with existing maps stored in the database.

Place recognition or Stitching may benefit from the metadata which is stored at the server and received from clients by filtering relevant bins/section stored in the SFM database and thus significantly reducing the search space, e.g., for matching image features. In one embodiment, location metadata may be used to filter spatially relevant map data contained within SFM database bins/sections which are close-by to a given location prior. Furthermore, temporal metadata may be used to filter appropriate map data for a specific season of the year (e.g., distinguishing between winter/summer maps in outdoor scenarios) or a specific time of day (e.g., distinguishing between morning and afternoon may be important because of different lighting conditions).

In some embodiments, the SFM database purges outdated or infrequently used map data, which may either be marked as expired (e.g., remains unused in place recognition and stitching) or completely discarded. Outdated map data may include keyframes that depict objects in the environment that do not exist anymore or have changed their appearance. For example, purging outdated keyframes may be due to construction activity in urban environments (to consider newly-built buildings or newly-arranged building facades etc.).

Outdated keyframes may be detected by comparing them with more recently acquired keyframes depicting the same objects using computer vision-based change detection techniques. These techniques allow for setting thresholds that can be used to decide whether or not to consider a keyframe as outdated. Furthermore, outdated map data may be detected using metadata properties such as timestamps. In one embodiment, the stitching map data 255 sent from the server to the client may consist of the essential information that enables the client to register its local map in global coordinates (e.g. the corresponding 7DOF similarity transformation and local map ID). This information consumes low (minimal) network bandwidth. In addition, clients may request extended map information from the server that will consume (considerably) more network bandwidth. Additional map information may incorporate keyframe poses, keyframe images, keyframe image features, 3D map points etc. The client may use this information to extend its local map.

Figure 3:
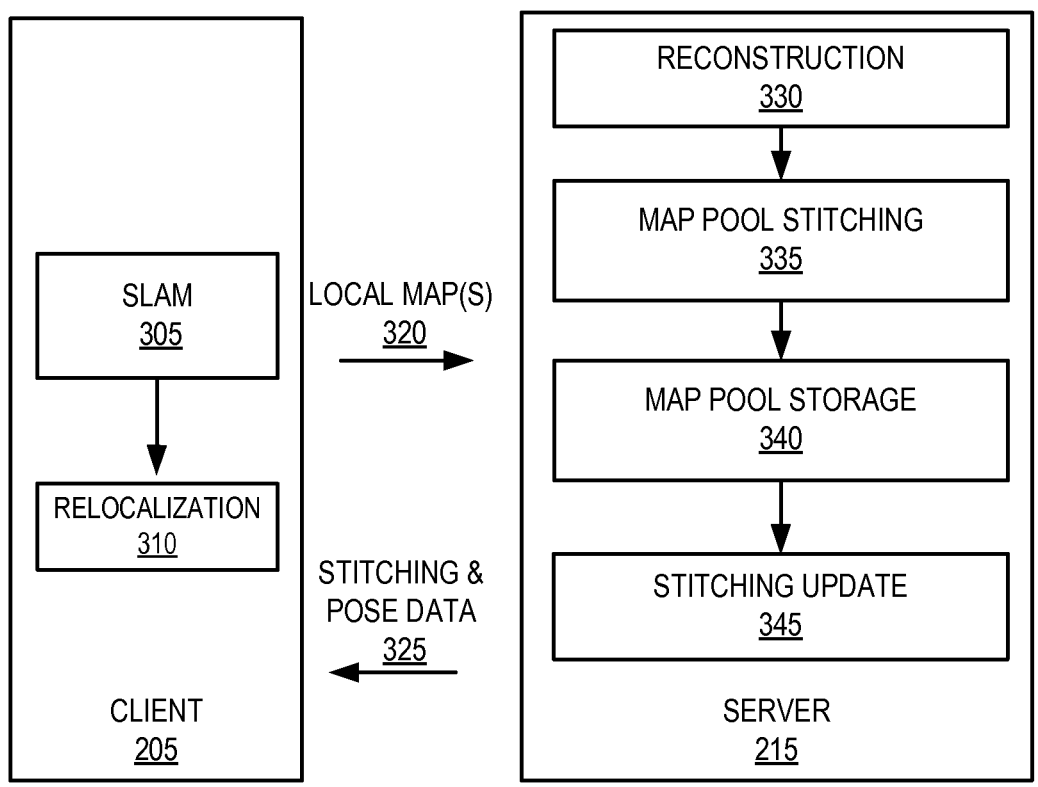
FIG. 3 illustrates the communication between client and server in a S3DM system, in one embodiment.

FIG. 3 illustrates the communication between client and server, in one embodiment. For example, client(s) 205 may perform local SLAM and maintain a local map. Local maps may include keyframes and 3D points. Local maps 320 from the clients may be sent to server 215 at specified intervals or time periods. Clients may start new maps in response to failure of re-localization by the SLAM system.

In one embodiment, server 215 includes reconstruction 330, map pool stitching 335, map pool storage 340, and stitching update 345, each of which may be individual or combined processes or modules. Server 215 performs reconstruction from local maps 320 received from client(s) 205. Local maps 320 are stored in map pool storage 340 until a single global map is determined. In response to determining two or more maps may be stitched, map pool stitching 335 of server 215 can perform stitching while continuing to receive map updates from clients. Local maps 320 may be stitched to every map in the map pool of server 215 if possible. In response to successful stitching of a client's local map within the server 215, stitching map data 325 is sent to the client. In one embodiment, map data 325 includes a local map ID, 7DOF transformation (e.g., response to a "place recognition" query), keyframes (e.g., used by the client to extend/refine its map), 3D points (e.g., used by the client to synchronize its map with the server), or any combination thereof.

Figure 4B:
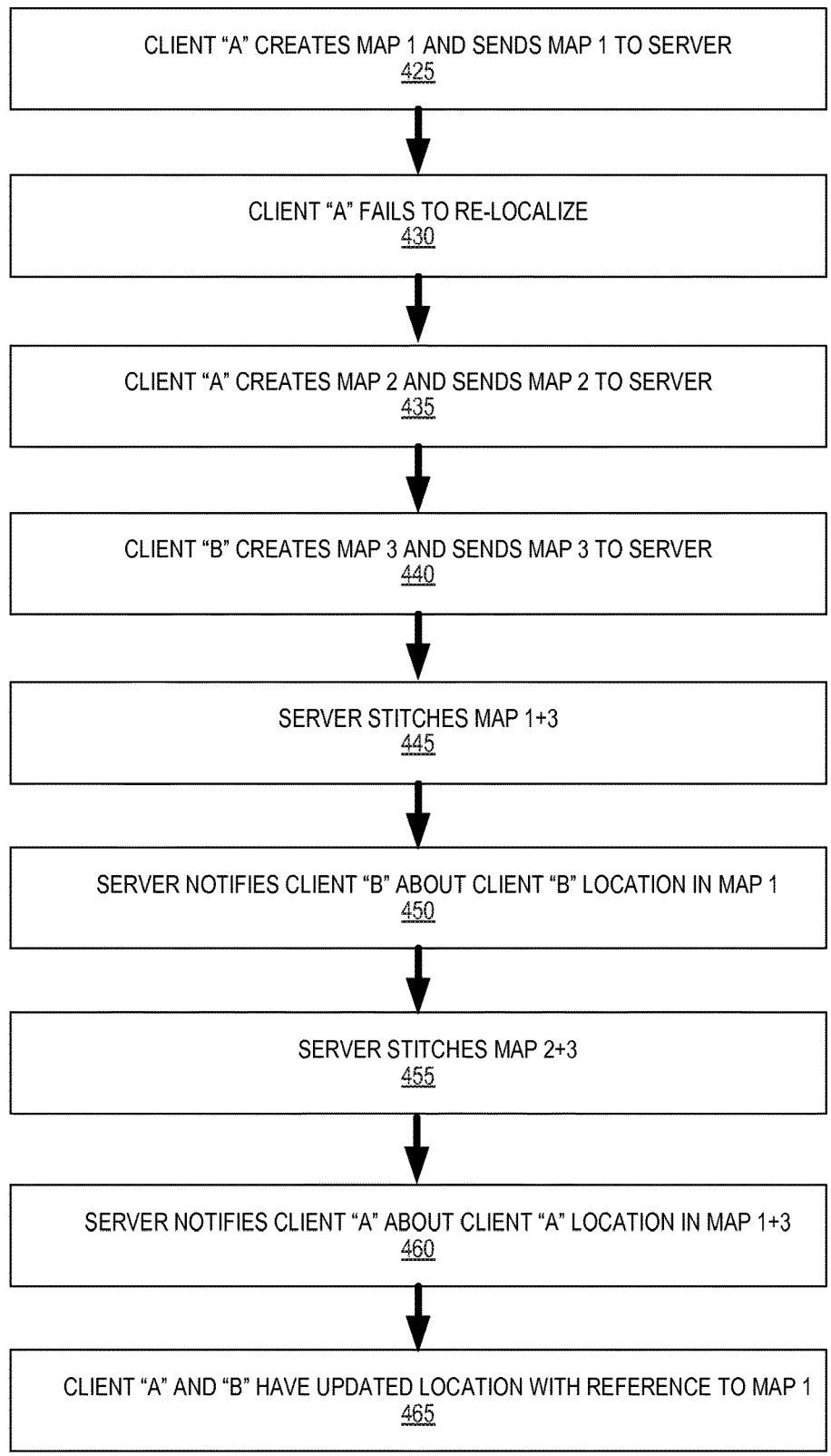
FIG. 4B illustrates a method for stitching maps illustrated in FIG. 4A, in one embodiment.

FIG. 4A illustrates stitching representation of maps associated with two different clients, in one embodiment. For example, Client A may create and/or track a first map "Map 1" 405, and a second map "Map 2" 410, however, Client A may not be initially aware of the presence of a third map "Map 3" 415 created and/or tracked by Client B. In one embodiment, a server stitches "Map 1" and "Map 3," and stitches "Map 2" and "Map 3," which leads to being able to stitch "Map 1" and "Map 2." Further details of this process is described below related to FIG. 4B.

FIG. 4B illustrates a method for stitching maps illustrated in FIG. 4A, in one embodiment. At block 425, client "A" creates Map 1 405 and sends Map 1 405 to server.

At block 440, client "A" fails to re-localize. For example, the camera may have moved to a location which does not have enough reference points to tie a current keyframe to any prior map keyframes.

At block 435, the client "A" creates Map 2 410 and sends Map 2 410 to server.

At block 440, the client "B" creates Map 3 415 and sends Map 3 415 to server. Client "A" and client "B" may be independent clients operating without any dependency or relationship to each other client in the S3DM system.

At block 445, the server stitches Map 1 and Map 3. For example, the server may use common characteristics or identifiers as discussed above to match one or more keyframes together and tie together a local map with a global server map, or may tie together two or more received local maps.

At block 450, the server notifies client "B" about client "B" location in Map 1. For example, Map 1 may be considered the global map for which relative location will be determined. Client "B" although previously unaware of Map 1, receives position and orientation data associated with Map 1 in response to the server's stitching local Map 3 to the Map 1.

At block 455, the server stitches Map 2 and 3. For example, the server may use common characteristics or identifiers as discussed above to match one or more keyframes together and tie together a local map with a global server map, or may tie together two or more received local maps.

At block 460, the server notifies client "A" about client "A" location in Map 1. For example, Map 1 may be considered the global map for which relative location will be determined. Client "A" although previously unaware of Map 3, receives position and orientation data associated with Map 2 in response to the server's stitching local Map 3 to the Map 2.

At block 465, clients "A" and "B" have updated their local coordinate systems with respect to the global reference coordinate system provided by Map 1. For example, Map 1 may be considered a global map used for tracking and mapping by multiple clients or servers.

Figure 5:
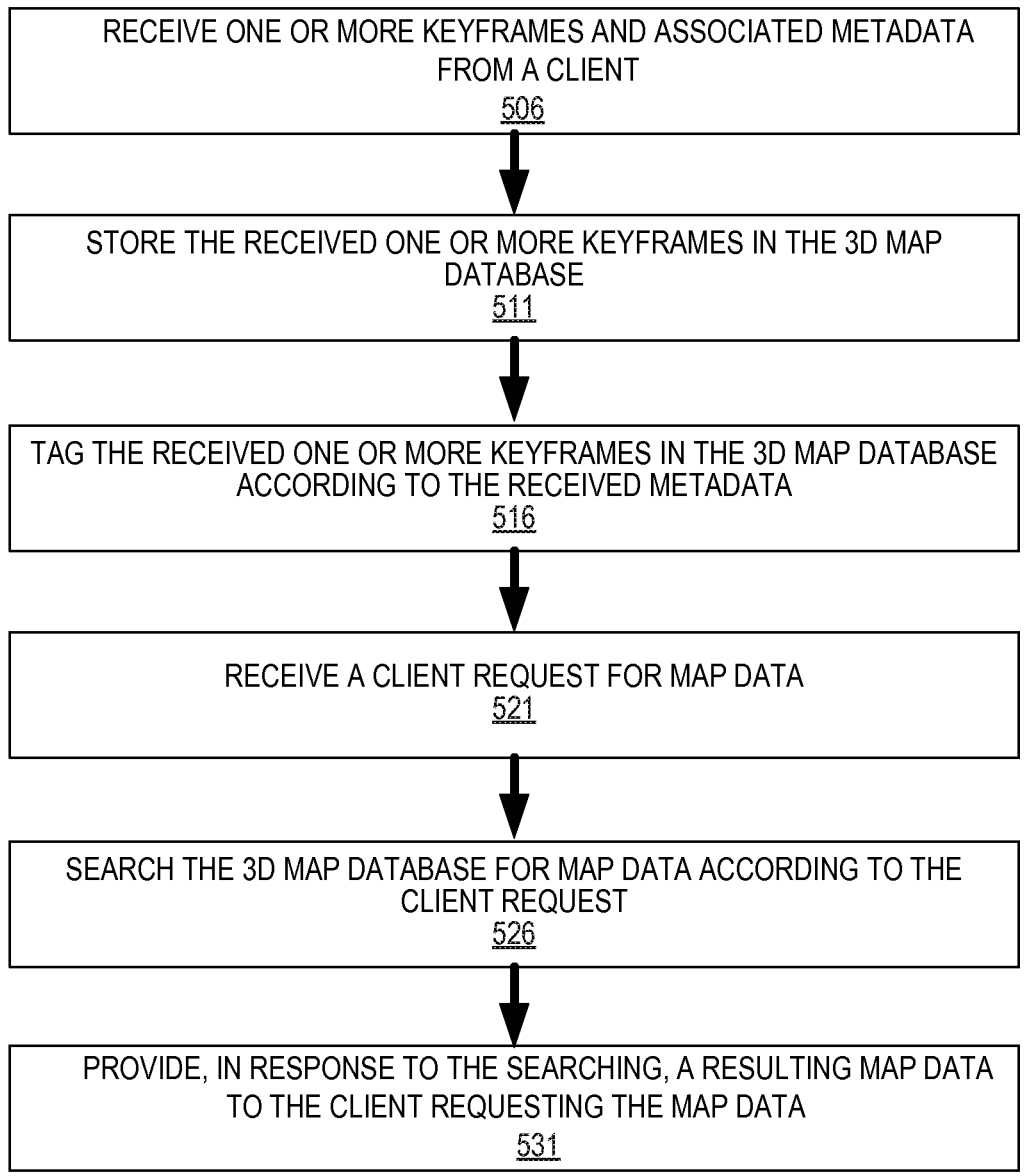
FIG. 5 illustrates a method for implementing a 3D map database for a S3DM system, in one embodiment.

FIG. 5 illustrates a method for implementing a 3D map database, in one embodiment. At block 506, the embodiment (e.g., S3DM) receives one or more keyframes and associated metadata from a client. In some embodiments, the server receives a plurality of keyframes and associated metadata from a plurality of different client devices and adds the plurality of keyframes and associated metadata into the 3D map database. Metadata may include one or more of: location data, client sensor data, user identification data, application identification data, temporal data, or any combination thereof. Location data may be GPS, WiFi-SSID, Bluetooth ID, mobile telecommunication base station identification, user entered location, or other location information. Client sensor data may include magnetometer (e.g., for compass), accelerometer (e.g., to determine gravity direction), clock, or other sensors. User identification data may be the user's identity as recorded on the device or as logged into the server. Application identification data may include the particular application used by the client. Temporal data may include calendar date and time of day. In some embodiments, the server stores the one or more keyframes within an image database. For example, storing the keyframes may occur in any case in response to (e.g., sometimes immediately in response to) receiving the keyframes, even if turns out that stitching or associating the one or more keyframes with a particular 3D map is not possible.

At block 511, the embodiment stores the received one or more keyframes in the 3D map database. For example, keyframes may be color/intensity images. In some embodiments the 3D map database includes an image database, and images can be registered with one or more maps.

At block 516, the embodiment tags the received keyframe in the 3D map database according to the received metadata. For example, if a nearby WiFi-SSID was discovered at the time of an image capture, the keyframe may be tagged with the WiFi-SSID. A tag may be a link or other data association to the keyframe that can be tracked and recorded within the 3D map database. For example, a field in the database which references a particular keyframe may contain metadata tags for the particular keyframe. In some embodiments, the metadata and the keyframe are received by a server separately or are separate components/input to the server and are joined or linked within the 3D map database after receipt of the keyframe and metadata. For example, the server can determine that a particular metadata should be tagged to a particular keyframe or vice versa. In some embodiments, one instance of metadata may be received and tagged to a plurality of keyframes. For example, a user ID may be applied to a set of incoming keyframes. In some embodiments, the server adjusts (e.g., adds, removes, and/or updates) metadata associated with keyframes in the database in response to new information.

At block 521, the embodiment receives a client request for map data, wherein the request includes a metadata query. The provided map data may include one or more of: texture data, vertex data, matrix data, or any combination thereof. In some embodiments, matrix data includes any kind of transformation (e.g., 7DOF similarity transformation, 6DOF pose, 3DOF rotation, etc.). For example, the transformation may be in response to a "place recognition query." In some embodiments, texture data includes keyframes for color, intensity, and depth images. In some embodiments, vertex data includes one or more of: 1D/2D/3D geometric primitives (e.g., points, edges, line segments, blobs), 2D/3D meshes (e.g., triangles, polygons), 2D geometric shapes (e.g., circles, rectangles, quads etc), 3D geometric shapes (e.g., spheres, cubes, cuboids, cylinders, cones, pyramids, cones), or feature descriptors (e.g., SIFT, SURF, BRIEF, etc.). Vertex data may be organized as: vertex array lists (e.g., to allow for defining multi-dimensional data, e.g., 3D point lists), index lists (e.g., to allow for defining relations between within the array list, e.g., array list elements 1,2,3 form a triangle), or attribute lists (e.g., to allow for defining semantics, e.g., array list are interpreted as triangles, SIFT descriptors etc.). In some embodiments, the map data provides an anchor point to enable synchronizing of corresponding client and server maps.

In some embodiments, in response to receiving a keyframe and associated metadata from a client device the server searches the 3D map database for map data compatible with the received keyframe and the associated metadata. In some embodiments, the server may utilize search terms to find or match specific map data in the 3D map database. Search terms may be generated by the server in response to particular client queries, or search terms received directly from clients. The server may also initiate, according to the results of the search, stitching of the received keyframe with one or more compatible 3D maps. The stitching of the received keyframe may be a background maintenance process independent from any currently pending client request for map data. The server may also store the stitched 3D map as a 3D map tagged with metadata.

In some embodiments, in response to receiving the client request for the map data, the server: selects, according to the metadata query, two or more maps, stitches the two or more maps to create an output map, and sends the output map as the 3D map to the client. The map sent to the client may be a previously stitched map, or may be a map stitched on demand/request from the client. For example, the server may receive a request or search term for metadata having location metadata that includes "Whispering Willow Mall." In some embodiments, a "Whispering Willow Mall" related map data may already have been stitched and fused together (e.g., from a previous search or because the search is a popular search), and the map data may be provided without any additional server processing. In other embodiments, "Whispering Willow Mall" may not have already computed map data on the server, but may be associated/tagged to a plurality of raw keyframes. Therefore, the server may, in response to a "Whispering Willow Mall" metadata search query, generate and provide map data associated with the requested metadata.

At block 526, the embodiment searches the 3D map database for map data according to the client request. In some embodiments, the server can alter or add to the metadata query with identifying characteristics of the client. For example, the server may know the client has authorization to a subsection of the 3D map database, or is interested only in a particular type of map data based on prior map data requests. At block 531, the embodiment provides, in response to the searching, a resulting map data to the client requesting the map data. In some embodiments, the server provides predetermined maps that have been stitched by the server according to a configurable stitching processing schedule. For example, the server may have a process to stitch potential keyframes and maps together on a nightly basis or according to another schedule. In some embodiments a server administrator may force a stitching operation at the server. In other embodiments, the server does not perform stitching without an explicit request from a client for a map. In some embodiments, the server purges outdated keyframes in response to receiving map or metadata indicating a threshold level of environment changes within an area captured by the outdated keyframes.

Figure 6:
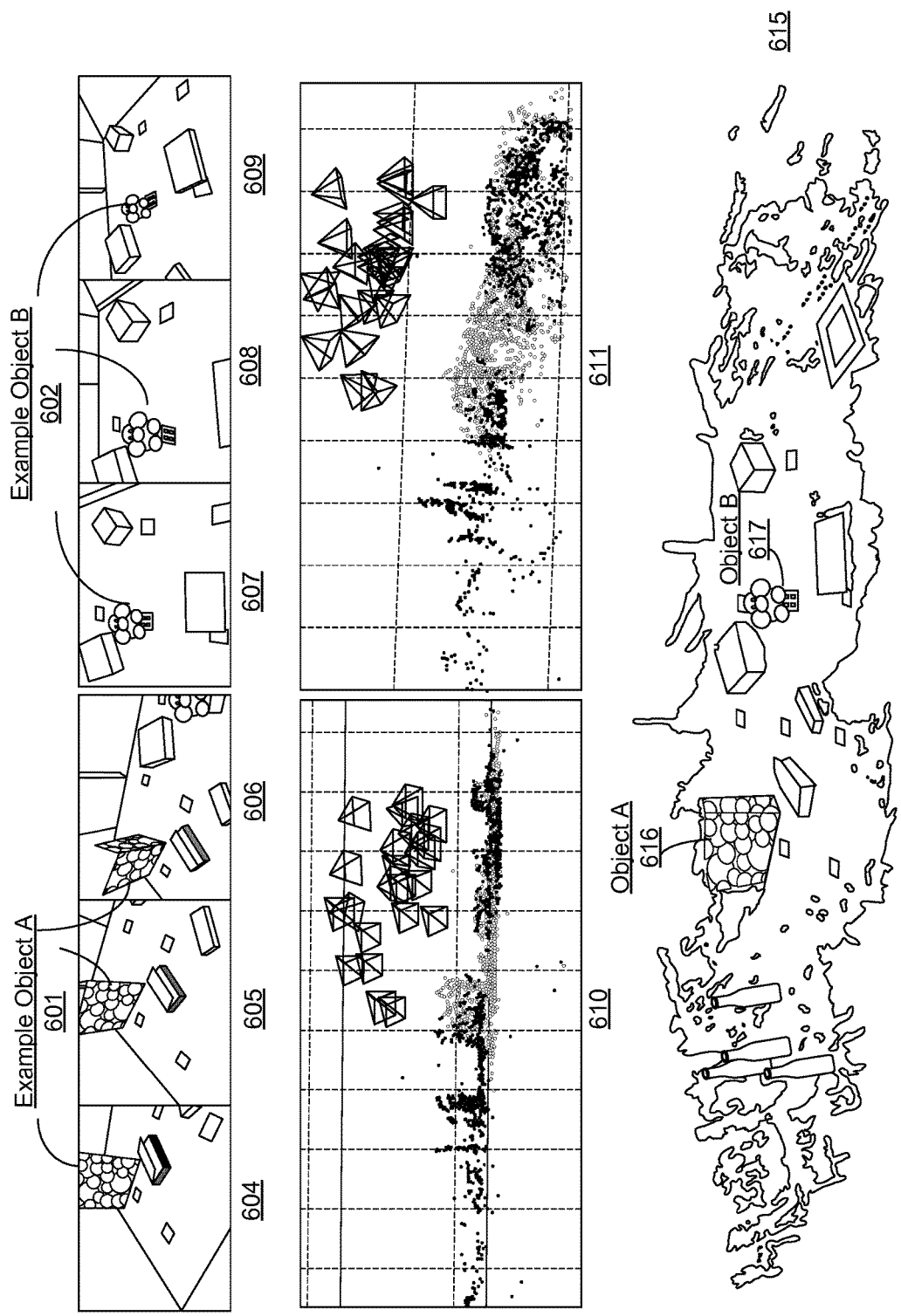
FIG. 6 illustrates a graphic representation of various stages and aspects of a S3DM system, in one embodiment.

FIG. 6 illustrates a graphic representation of various stages and aspects of a S3DM system, in one embodiment. Sections 604-609 illustrate keyframes of individual SLAM clients observing the same scene simultaneously (e.g., the scene containing Object A 601 and Object B 602). Sections 610 and 611 illustrate a sparse point map created by the server using the keyframes from four clients. Section 615 illustrates a densified server point cloud reconstruction of the scene (e.g., also including Object A 616, and Object B 617 from keyframes 604-609).

Figure 7:
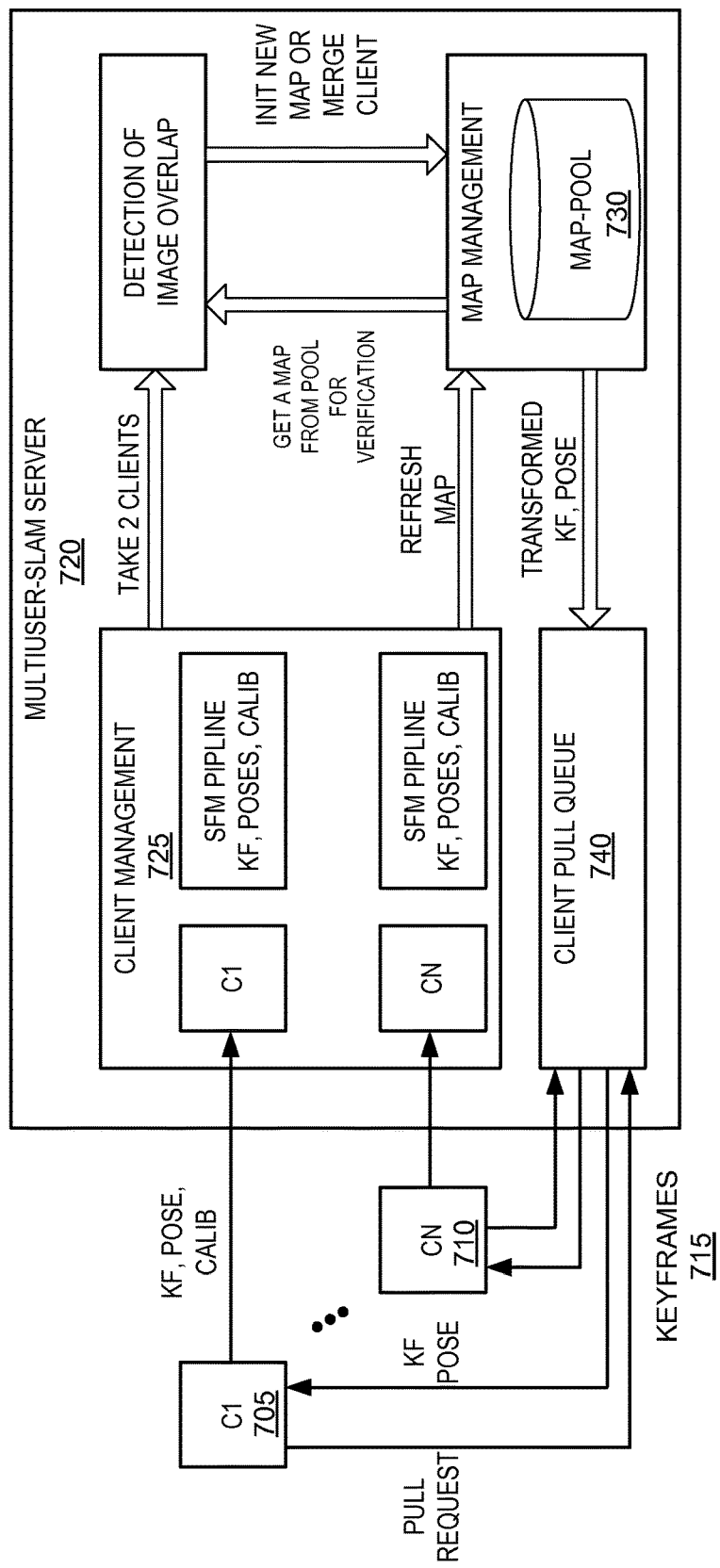
FIG. 7 illustrates a client-server S3DM system architecture, in one embodiment.

FIG. 7 illustrates a client-server system architecture, in one embodiment. In one embodiment, the nodes C1 705 through Cn 710 represent SLAM clients, submitting information (e.g. keyframes 715) to the SfM server (e.g., multiuser-SLAM server 720). In one embodiment, for each client, the server creates a client management module 725, where a new map is reconstructed and stored in the map pool (e.g., map pool 730). The server may continuously update the client maps and attempts to merge multiple maps. In one embodiment, the server pushes relevant information (e.g. keyframes with camera poses) into the client pull queues (e.g., pull queue 740). In one embodiment, clients can pull relevant information from the pull queue to update their own local map.

Figure 8:
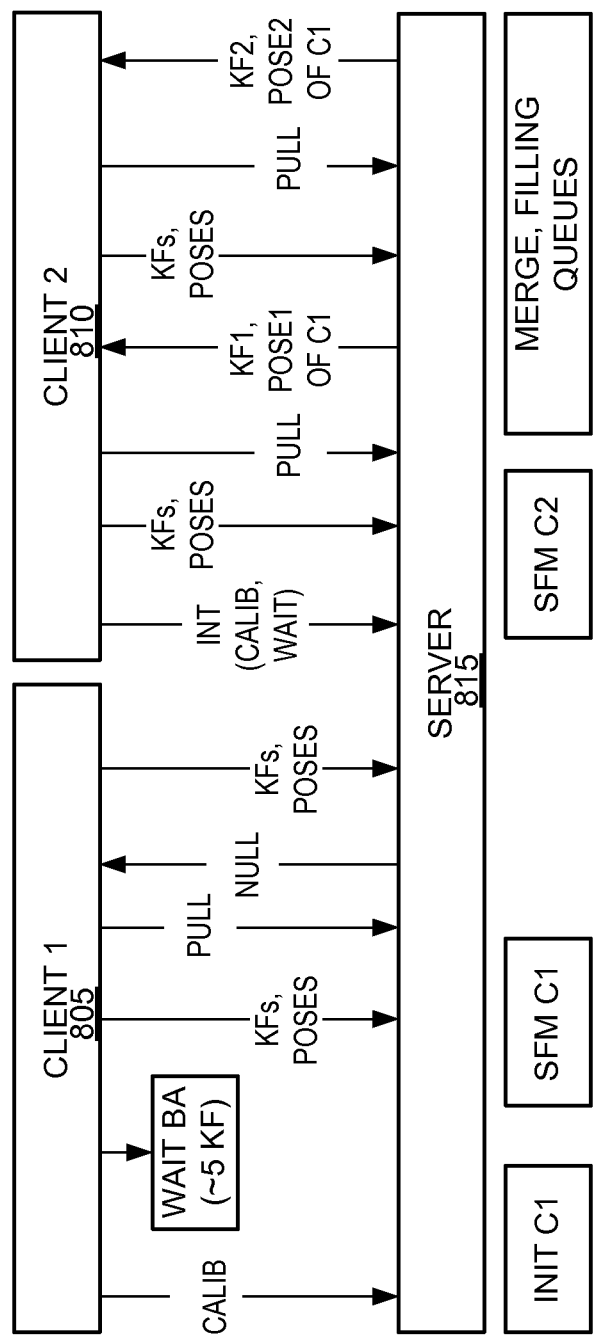
FIG. 8 illustrates a S3DM server-client communication, in one embodiment.

FIG. 8 illustrates S3DM server-client communication, in one embodiment. In one embodiment, Client 1 805 commits its calibration, keyframes and poses, and triggers Server 815 to start the reconstruction, while trying to pull new data. Client 2 810 may perform the same initial steps as Client 1 805. Server 815 starts searching for correspondences between Client 1 805 and Client 2 810. Server 815 may merge the 3D structures and fill the client's queues. In one embodiment, pull requests will be answered with keyframes and poses from the common map.

In one embodiment, a S3DM system includes a server running an SfM pipeline and multiple clients running SLAM. The reconstructions created by clients and server may use different feature descriptions, may reside in different coordinate systems, and may be created asynchronously, for example using per node strategies involving global or local optimization. As illustrated in the example implementation of FIG. 8, clients (e.g., 805 and 810) and server (e.g., 815) may communicate over the network using a protocol focusing on keyframes and camera poses. In one embodiment, after connecting to the server, a client first registers its ID and provides its internal camera calibration. The server can initialize a per-client message queue. In one embodiment, after initializing its local SLAM map, the client can submit the corresponding stereo keyframe pair to the server, which can reconstruct a per-client map independently of the client's own map. During operation, the client can asynchronously pull messages from its queue (e.g. during idle times of background mapping thread). Upon certain events, the server may insert relevant information into the client's queue. For example, if a second client transmits a keyframe that allows the merging of two clients' maps, the server offers additional keyframes and corresponding poses. The client may incorporate these keyframes into its local map. Additionally, the server may provide anchor points that allow for synchronizing the reference coordinate systems between multiple client instances.

In one embodiment, the server implements a SfM pipeline and uses SIFT features calculated on the GPU. In one embodiment, every client is assigned a separate instance of the reconstruction pipeline at the server. Upon commitment of keyframes, the server can create a sparse 3D reconstruction of the scene for each client and investigates a potential image overlap between the views of clients by feature matching and epipolar geometry estimation. Based on this overlap detection, either a new map is introduced (e.g., added to the map pool) or an existing one is enlarged through merging. Maps in the pool keep pace with the client reconstructions and are refreshed through the insertion of new keyframes, as client reconstructions grow. Managing stored maps may include inserting yet unseen keyframes from other clients and the corresponding pose information into client queues. The map merging process may be based on the feature point correspondences established during overlap detection. In one embodiment, a P3P (perspective three point) algorithm may be used to process a keyframe of client A with a pose and the map of client B, thereby recovering the pose of the keyframe of client A in the coordinate system of client B. A single 3D point X triangulated in both maps of clients A and B may suffice to estimate the remaining scale factor s through:

$$s = \frac{\|X_A - c_A\|}{\|X_B - c_B\|} \quad \text{EQ. 1}$$

where c denotes the corresponding camera centers. Robustness may be achieved by continuously re-estimating the scale factor as the median over the distance ratios between the camera centers and all 3D points commonly triangulated. The 3D structure from client A may be transformed into the coordinate system of client B through $$X^B = (P_A^B)^{-1} \cdot \begin{pmatrix} X_A' \cdot s \\ 1 \end{pmatrix} \text{ with } X_A' = P_A \cdot \begin{pmatrix} X_A \\ 1 \end{pmatrix} \quad \text{EQ. 2}$$

and the poses of the keyframes i=1 . . . n of client A may be transformed according to $$P_{(i)A}^B = P_{(i)A} * \begin{bmatrix} (P_A)^{-1} & \\ 0^T & 1 \end{bmatrix} * \begin{bmatrix} (P_A^B) & \\ 0^T & s \end{bmatrix} \quad \text{EQ. 3}$$

Once a client adds a new keyframe to its local map, S3DM may enlarge the corresponding server-side reconstruction, running bundle adjustment on the newer subset of keyframes and points and fixing previous ones to maintain real-time performance, as maps grow large. Subsequently, the server can provide the keyframe to all other clients observing the same scene. S3DM may warp each keyframe to fit the client's camera calibration before being placed in the outbound queue. The server may also provide the corresponding pose, transformed in the respective individual client's coordinate system, thereby avoiding additional computational effort on the client side. Finally, the server may also offer 3D points and their corresponding observations, if proven stable by bundle adjustment.

In one embodiment FIG. 8 outlines the communication between the server and two clients for the reconstruction of the scene depicted in FIG. 6. Network communication may operate asynchronously through per-client queues. In one embodiment the individual queues may be replaced by a publish-subscribe pattern that reduces network traffic.

Figure 9:
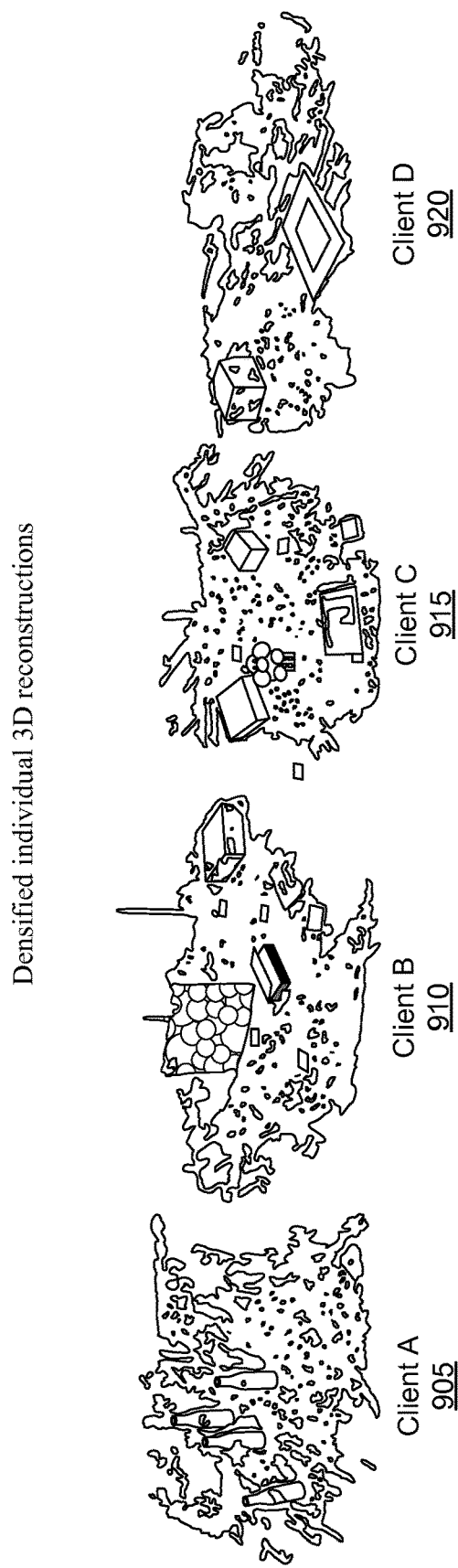
FIG. 9 illustrates densified individual 3D reconstructions of four S3DM clients, in one embodiment.

FIG. 9 illustrates densified individual 3D reconstructions of four clients, in one embodiment. Various client types (e.g., clients A 905, B 910, C 915, and D 920) can become part of the swarm. In one embodiment, the underlying SLAM system can use corners tracked across frames to create 3D map points, which may differ from those built by the server. A client can determine independently on the type and amount of data it wants to read from the queue provided by the server, for instance, when it has spare computational resources.

Figure 10:
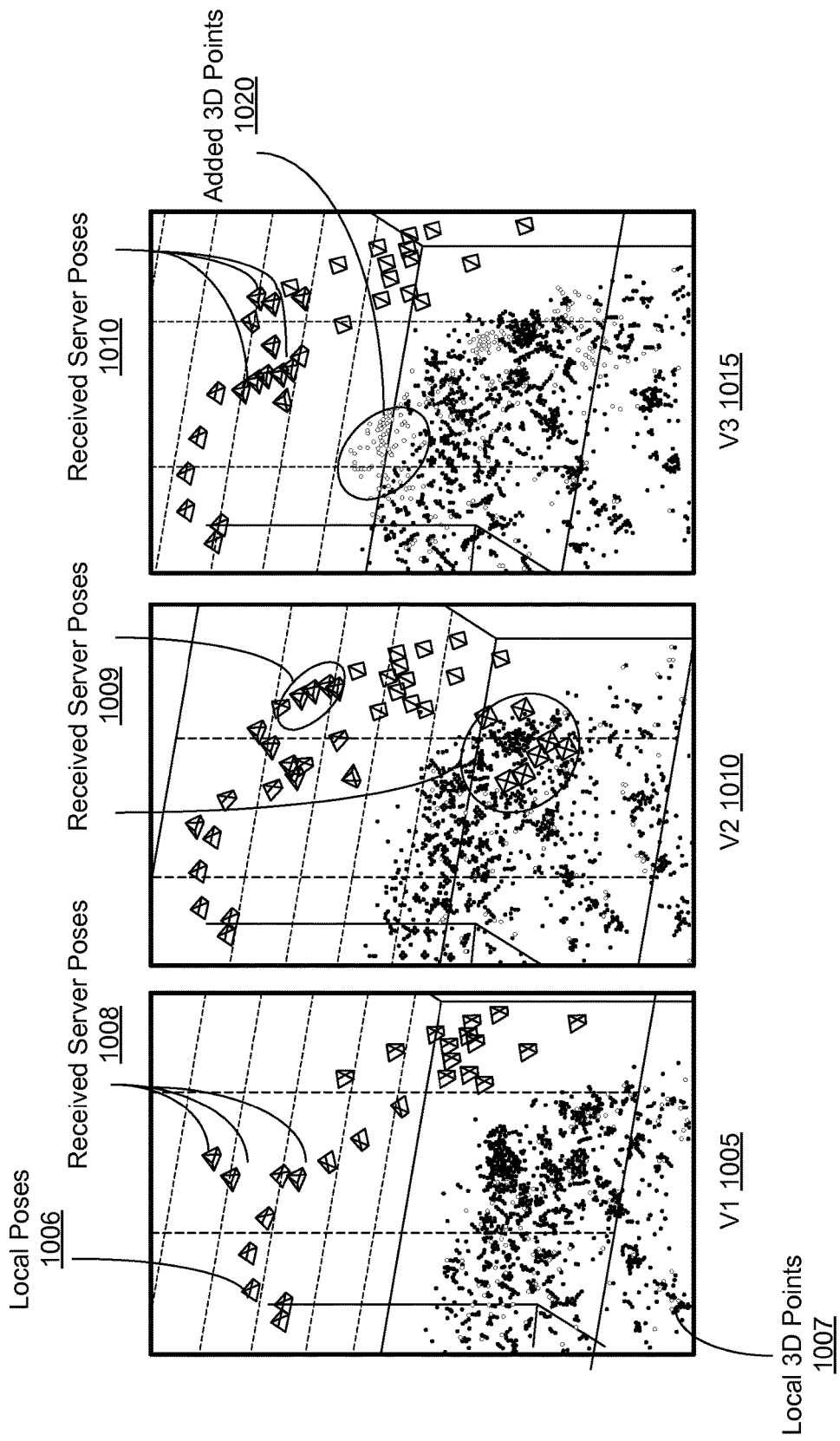
FIG. 10 illustrates various S3DM client modes, in one embodiment.

FIG. 10 illustrates various client modes, in one embodiment. Client mode V1 1005 (keyframes only), V2 1010 (keyframes and server poses) and V3 1015 (keyframes, server poses, and 3D point triangulation). As illustrated, V1 1005 includes local poses 1006, local 3D points, and received server poses 1008. V2 further includes additional received server poses 1009. V3 includes additional server poses 1010 and additional added 3D points 1020. As illustrated, V1 1005 has only added some of the received poses, because the RANSAC parameterization is set to avoid false positives. As illustrated, V2 1010 added all received keyframes and poses, and V3 1015 additionally triangulated new 3D points.

As illustrated in V1 1005, the client is only reading keyframes and adding it to the map through P3P. The feature correspondences may be established through exhaustive matching of patches around corners in the new keyframe and the existing keyframes. This approach is simple, but expensive, and can occasionally lead to wrong pose estimates. As illustrated in V2 1010 the client is reading keyframes with poses from the server. These keyframes can be directly added to the local map, by extracting observations from existing 3D points through back-projection. This approach is very fast, but does not create any new 3D points based on features from server keyframes. As illustrated in V3 1015 the client improves upon V2 1010 by creating additional 3D points from the new keyframes. In one embodiment, the search for matching features is guided by poses provided by the server. As illustrated, the additional map densification may utilize more computational resources than V2 1010, however, the additional resources can enable the client to grow its maps into yet unseen areas through keyframes from other clients.

In one embodiment, S3DM can enforce eventual consistency between the server and its clients over time. S3DM can synchronize corresponding client and server maps by applying an anchor point method. For each remote client map, the server can determine a set of well-converged 3D map points that can be used to align the corresponding local client map. The anchor points can be integrated into the local client maps as fixed points and provide strong constraints in the clients' bundle adjustment optimization. In particular, a consistent reference coordinate system may be established, which is useful for collaborative AR applications, where multiple clients are ideally implemented to render virtual objects in a consistent way.

As described above, FIG. 6 illustrates keyframes received from clients and the successfully merged map from four clients. FIG. 9 illustrates the individual remote client maps reconstructed by the server. Congestion of the client may occur after a map merges triggered a large map update, consisting of potentially many new keyframes. S3DM may overcome this congestion by restricting the maximum rate at which a client processes map updates. The map information provided by the server can be employed by the clients to extend and refine their local maps. The example types of clients are illustrated in FIG. 10. Client type V3 may represent a trade-off between tracking performance and map enhancements. In some embodiments, S3DM may actively switch between modes V2 and V3, enabling the client to improve the tracking performance with low computational overhead and to enlarge its map whenever computationally possible. In addition to reconstructing and maintaining a shared map pool, the S3DM server allows registration annotations, and, thus, enables simple collaborative AR applications.

Figure 11:
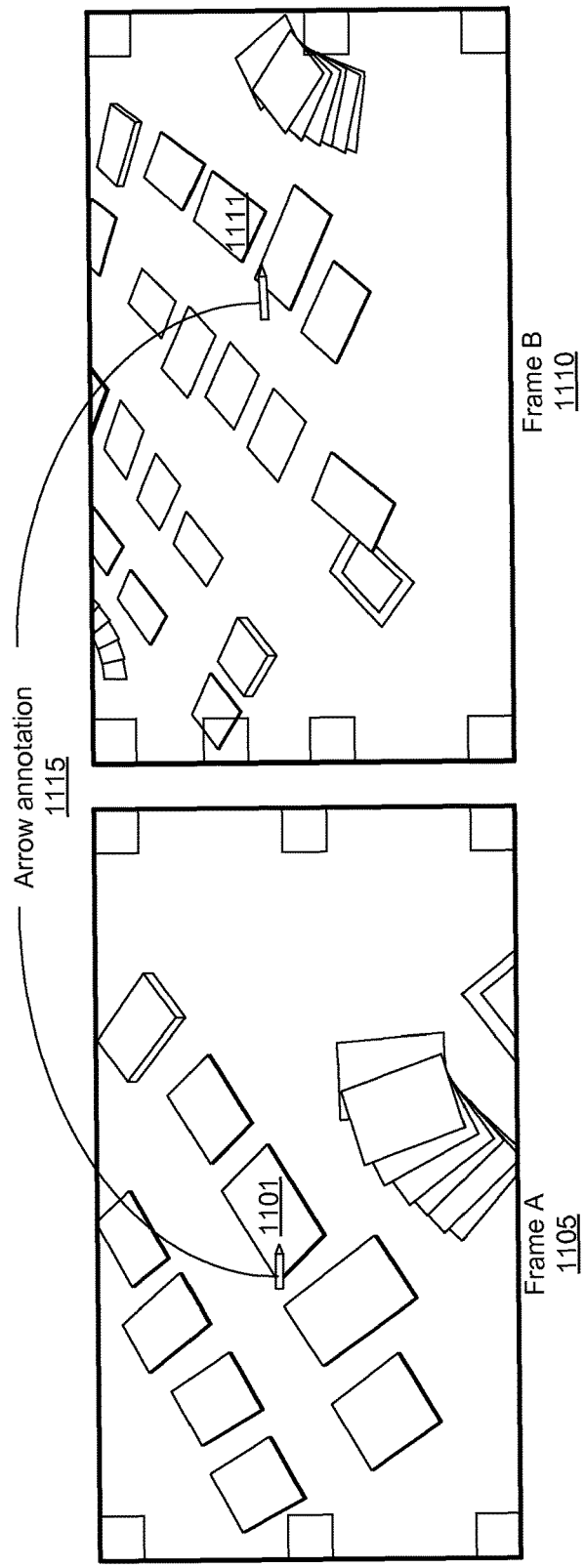
FIG. 11 illustrates a live AR view of two S3DM clients in a card game, in one embodiment.

FIG. 11 illustrates a live AR view of two clients in a card game, in one embodiment. FIG. 11 includes shared annotations, i.e. the arrows 1115 pointing to one of the cards. Created by either of the clients, an annotation 1115 may be first registered in the local client map coordinate system. After merging two clients maps, the server implementing S3DM as described herein can automatically transform all registered annotations into the common reference coordinate system and push them to the corresponding clients. Due to the server-side calculation, no computational overhead is generated on the client-side. Frame 1105 illustrates C1 annotating an object card (e.g., 1101) and commits the annotation to the server. Frame 1110 illustrates as soon as C2 pulls from the server, the arrow annotation is also visualized in relation to the object card (e.g., 1111) from frame 1105.

As described above, device 100 can be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use the device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

Movement of the device 100 and camera 114 can cause the display to update, in real-time, an augmentation of a target (e.g., one or more objects or scenes) in the Global SLAM Map. With movement of the device away from an initial reference image position, the device can capture additional images from alternate views. After extracting features and triangulating from additional keyframes, increased accuracy of the augmentation can be achieved (e.g., borders around an object may fit more precisely, the representation of the object in the scene will appear more realistic, and target placement can be more accurate relative to the camera 114 pose).

In one embodiment, an object or graphic may be inserted or integrated into a video stream (or image) captured by the camera 114 and displayed on display 112. S3DM may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time with seamless tracking from the original scene. For example, text on a sign may be replaced with alternate text, or a 3D object may be strategically placed in the scene and displayed on device 100. When the user changes the position and orientation of the camera 114, the graphic or object can be adjusted or augmented to match the relative movement of the camera 114. For example, if a virtual object is inserted into an augmented reality display, camera movement away from the virtual object can reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation can be animated within the scene represented by S3DM. For example, an animated object can "move" within a scene depicted in the augmented reality display.

A person of skill in the art will recognize that embodiments described herein can be implemented in ways other than AR (e.g., robot positioning).

S3DM may be implemented as software, firmware, hardware, module or engine. In one embodiment, the previous S3DM description may be implemented by the general purpose processor 161 in device 100 to achieve the previously desired functions (e.g., methods related to FIG. 2, FIG. 3, FIG. 4B, and FIG. 5). In one embodiment, S3DM may be implemented as an engine or module, which may include an Image Processing module 171, and SLAM module 173 as subcomponents. In other embodiments, features of one or more of the described subcomponents may be combined or partitioned into different individual components, modules or engines.

The teachings herein may be incorporated into (e.g., implemented within or performed by) a variety of apparatuses (e.g., devices). In one embodiment, the S3DM system can be implemented as an engine or module executed by a processor to receive images or video as input. One or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a user I/O device, a computer, a server, an entertainment device, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method performed by a server for implementing a 3D map database, the method comprising:
   receiving one or more keyframes and associated metadata from a client;
   storing the received one or more keyframes in the 3D map database;
   tagging the received one or more keyframes in the 3D map database according to the received metadata;
   stitching, according to a stitching processing schedule of the server, the received one or more keyframes with one or more other keyframes or 3D maps in the 3D map database;
   storing, in the 3D map database, a result of the stitching as a stitched 3D map tagged with at least some of the associated metadata;
   receiving a client request for map data;
   searching the 3D map database that includes the stitched 3D map for map data according to the client request; and
   providing, in response to the searching, a resulting map data to the client requesting the map data.

2. The method of claim 1, wherein the provided map data includes one or more of: texture data, vertex data, matrix data, or any combination thereof.

3. The method of claim 2, wherein the map data provides an anchor point to enable synchronizing of corresponding client and server maps.

4. The method of claim 1, wherein the metadata includes one or more of: location data, client sensor data, user identification data, application identification data, temporal data, or any combination thereof.

5. The method of claim 1, further comprising:
   searching the 3D map database for 3D maps to stitch with the received one or more keyframes and the associated metadata, and wherein the stitching is performed according to results of the search.

6. The method of claim 1, wherein the stitching is performed in response to receiving the one or more keyframes.

7. The method of claim 1, wherein in response to receiving the client request for map data the server selects a previously stitched map to send to the client.

8. The method of claim 1, wherein the client request includes search terms comprising one or both of metadata or a 3D map database query.

9. The method of claim 1, further comprising:
   purging outdated keyframes in response to receiving a keyframe or metadata indicating a threshold level of environment changes have occurred within an area captured by the outdated keyframes.

10. A server to implement a 3D map database, the server comprising:
  memory; and
  a processor coupled to the memory and configured to:
    receive one or more keyframes and associated metadata from a client;
    store the received one or more keyframes in the 3D map database;
    tag the received one or more keyframes in the 3D map database according to the received metadata;
    stitch, according to a stitching processing schedule of the server, the received one or more keyframes with one or more other keyframes or 3D maps in the 3D map database;
    store, in the 3D map database, a result of the stitching as a stitched 3D map tagged with at least some of the associated metadata;
    receive a client request for map data;
    search the 3D map database that includes the stitched 3D map for map data according to the client request; and
    provide, in response to the searching, a resulting map data to the client requesting the map data.

11. The server of claim 10, wherein the provided map data includes one or more of: texture data, vertex data, matrix data, or any combination thereof.

12. The server of claim 11, wherein the map data provides an anchor point to enable synchronizing of corresponding client and server maps.

13. The server of claim 10, wherein the metadata includes one or more of: location data, client sensor data, user identification data, application identification data, temporal data, or any combination thereof.

14. The server of claim 10, wherein the processor is configured to:
  search the 3D map database for 3D maps to stitch with the received one or more keyframes and the associated metadata; and
  perform the stitching according to results of the search.

15. The server of claim 10, wherein the processor is configured to perform the stitching in response to receiving the one or more keyframes.

16. The server of claim 10, wherein in response to receiving the client request for map data the server selects a previously stitched map to send to the client.

17. The server of claim 10, wherein the client request includes search terms comprising one or both of metadata or a 3D map database query.

18. The server of claim 10, further comprising instructions to: purge outdated keyframes in response to receiving a keyframe or metadata indicating a threshold level of environment changes have occurred within an area captured by the outdated keyframes.

19. An apparatus for implementing a 3D map database, the apparatus comprising:
  means for receiving one or more keyframes and associated metadata from a client;
  means for storing the received one or more keyframes in the 3D map database;
  means for tagging the received one or more keyframes in the 3D map database according to the received metadata;
  means for stitching, according to a stitching processing schedule of the apparatus, the received one or more keyframes with one or more other keyframes or 3D maps in the 3D map database;
  means for storing, in the 3D map database, a result of the stitching as a stitched 3D map tagged with at least some of the associated metadata;
  means for receiving a client request for map data;
  means for searching the 3D map database that includes the stitched 3D map for map data according to the client request; and
  means for providing, in response to the searching, a resulting map data to the client requesting the map data.

20. The apparatus of claim 19, wherein the provided map data includes one or more of: texture data, vertex data, matrix data, or any combination thereof.

21. The apparatus of claim 20, wherein the map data provides an anchor point to enable synchronizing of corresponding client and server maps.

22. The apparatus of claim 19, wherein the metadata includes one or more of: location data, client sensor data, user identification data, application identification data, temporal data, or any combination thereof.

23. The apparatus of claim 19, further comprising:
  means for searching the 3D map database for 3D maps to stitch with the received one or more keyframes and the associated metadata, wherein the means for stitching comprises means for stitching according to results of the search.

24. The apparatus of claim 19, wherein the means for stitching performs the stitching in response to receiving the one or more keyframes by the means for receiving the one or more keyframes.

25. The apparatus of claim 19, further comprising:
  means for purging outdated keyframes in response to receiving a keyframe or metadata indicating a threshold level of environment changes have occurred within an area captured by the outdated keyframes.

26. A machine readable non-transitory storage medium having stored therein program instructions that are executable by a server's processor to:
  receive one or more keyframes and associated metadata from a client;
  store the received one or more keyframes in a 3D map database;
  tag the received one or more keyframes in the 3D map database according to the received metadata;
  stitch, according to a stitching processing schedule of the server, the received one or more keyframes with one or more other keyframes or 3D maps in the 3D map database;
  store, in the 3D map database, a result of the stitching as a stitched 3D map tagged with at least some of the associated metadata;
  receive a client request for map data;
  search the 3D map database that includes the stitched 3D map for map data according to the client request; and
  provide, in response to the searching, a resulting map data to the client requesting the map data.

27. The medium of claim 26, wherein the provided map data includes one or more of: texture data, vertex data, matrix data, or any combination thereof.

28. The medium of claim 26, wherein the metadata includes one or more of: location data, client sensor data, user identification data, application identification data, temporal data, or any combination thereof.

29. The medium of claim 26, further comprising instructions to:
  search the 3D map database for 3D maps to stitch with the received one or more keyframes and the associated metadata, and wherein the instructions are executable to by the server's processor to perform the stitching according to results of the search.

30. The medium of claim 26, further comprising instructions to:
purge outdated keyframes in response to receiving a keyframe or metadata indicating a threshold level of environment changes have occurred within an area captured by the outdated keyframes.

* * * * *